United States Patent
Pak et al.

(10) Patent No.: US 8,230,112 B2
(45) Date of Patent: Jul. 24, 2012

(54) DYNAMIC SUPPORT OF MULTIPLE MESSAGE FORMATS

(75) Inventors: Wai H. Pak, Hercules, CA (US); Sanjeev Kumar, San Mateo, CA (US); Anil Kumar Annadata, Milpitas, CA (US); Yu Jen Wu, San Mateo, CA (US)

(73) Assignee: Siebel Systems, Inc., San Mateo, CA (US)

( * ) Notice: Subject to any disclaimer, the term of this patent is extended or adjusted under 35 U.S.C. 154(b) by 842 days.

(21) Appl. No.: 10/400,895

(22) Filed: Mar. 27, 2003

(65) Prior Publication Data

US 2007/0198742 A1 Aug. 23, 2007

(51) Int. Cl.
 *G06F 15/16* (2006.01)
 *G06F 17/28* (2006.01)
 *G10L 21/00* (2006.01)

(52) U.S. Cl. ............. 709/246; 709/206; 704/2; 704/277

(58) Field of Classification Search .................. 704/8, 9, 704/2, 277; 710/65; 709/206, 246; 715/746, 715/747
 See application file for complete search history.

(56) References Cited

U.S. PATENT DOCUMENTS

| | | | | |
|---|---|---|---|---|
| 5,940,790 | A * | 8/1999 | Vesterinen | 704/8 |
| 6,463,404 | B1 * | 10/2002 | Appleby | 704/9 |
| 6,704,723 | B1 * | 3/2004 | Alavi et al. | 707/999.003 |
| 6,850,930 | B2 * | 2/2005 | Shetty | 707/3 |
| 6,871,236 | B2 * | 3/2005 | Fishman et al. | 709/246 |
| 6,883,007 | B2 * | 4/2005 | Atkin | 707/999.101 |
| 6,993,471 | B1 * | 1/2006 | Flanagan et al. | 704/2 |
| 7,111,076 | B2 * | 9/2006 | Abjanic et al. | 709/246 |
| 7,231,421 | B2 * | 6/2007 | Kawakura et al. | 709/203 |
| 7,272,662 | B2 * | 9/2007 | Chesnais et al. | 709/246 |
| 7,386,590 | B2 * | 6/2008 | Warren et al. | 709/206 |
| 7,389,474 | B2 * | 6/2008 | Rettig et al. | 715/263 |
| 7,401,016 | B2 * | 7/2008 | Masuichi et al. | 704/9 |
| 2002/0052902 | A1 * | 5/2002 | Bauer | 707/536 |
| 2002/0111967 | A1 * | 8/2002 | Nagase | 709/203 |
| 2002/0120689 | A1 * | 8/2002 | Kang et al. | 709/206 |
| 2002/0138526 | A1 * | 9/2002 | Crawford et al. | 707/530 |
| 2002/0165708 | A1 * | 11/2002 | Kumhyr | 704/8 |
| 2002/0194286 | A1 * | 12/2002 | Matsuura et al. | 709/206 |
| 2003/0025943 | A1 * | 2/2003 | Carey | 358/402 |
| 2003/0033334 | A1 * | 2/2003 | Banerjee et al. | 707/542 |
| 2003/0101283 | A1 * | 5/2003 | Lewis et al. | 709/246 |
| 2003/0101343 | A1 * | 5/2003 | Eaton et al. | 713/170 |
| 2003/0115119 | A1 * | 6/2003 | Schleicher | 705/35 |
| 2003/0182453 | A1 * | 9/2003 | Kim et al. | 709/246 |
| 2003/0208546 | A1 * | 11/2003 | DeSalvo et al. | 709/206 |
| 2004/0167784 | A1 * | 8/2004 | Travieso et al. | 704/270.1 |
| 2004/0172484 | A1 * | 9/2004 | Hafsteinsson et al. | 709/246 |
| 2006/0020673 | A1 * | 1/2006 | Sorge et al. | 709/206 |

* cited by examiner

*Primary Examiner* — Gregory Todd
(74) *Attorney, Agent, or Firm* — Campbell Stephenson LLP (57) ABSTRACT

A method, system, computer system and computer program product to enable a single interface to be used to prepare and present messages in a variety of different formats. For example, the single interface can be used to prepare, receive or display messages in different languages, such as English or Japanese, which require different character sets. Furthermore, the single interface supports preparing, sending, and receiving messages in multiple text formats, such as plain text, rich text, and Multiple Internet Mail Extension (MIME) format. A message can be received in a native format, and a format for providing a response to the message can be dynamically selected. The response is provided in the dynamically-selected format.

20 Claims, 8 Drawing Sheets

DYNAMIC SUPPORT OF MULTIPLE MESSAGE FORMATS

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to messaging systems, and more particularly, to supporting multiple message formats in a single user interface.

2. Description of the Related Art

In a 24×7 international business environment, electronic messaging provides a convenient way for companies to communicate with customers all over the globe. Currently, many companies have dedicated e-mail inboxes defined for specific business areas. Often, employees called agents are assigned to poll and manage the support requests from customers for one or more dedicated e-mail inboxes, as well as from their individual agent inboxes. With customer support centers handling very large numbers of customer support requests daily, increasing the efficiency of each agent in responding to each customer request by only seconds can produce enormous cost savings for the customer support center.

To provide international support, companies must be able to communicate with customers using a variety of electronic messaging systems, languages, and formats. Even within a single messaging system, messages can be sent and received having many different formats. For example, common electronic mail formats include plain text, rich text, and hypertext markup language (HTML). In addition, a message may be communicated in one language, such as Japanese, requiring a different character set for display than the default configuration for the recipient, who may, for example, use English as a default language. Preserving the original format of a message can be valuable in formulating a response to the message.

If a company wishes to implement a customer support center where agents can communicate using multiple messaging systems, typically the company must purchase different software products to handle each messaging system because of the different communication protocols involved. Because different products must be purchased, agents must learn to use a different user interface for each messaging system. Efficiency of an agent typically degrades when he or she must remember different user interfaces for communicating with customers via different messaging systems.

Thus, it is desirable to enable customer service agents to communicate with customers in a variety of electronic message formats from within a single user interface.

SUMMARY OF THE INVENTION

The present invention enables a single interface to be used to prepare and present messages in a variety of different formats. For example, the single interface can be used to prepare, receive or display messages in different languages, such as English or Japanese, which require different character sets. Furthermore, the single interface supports preparing, sending, and receiving messages in multiple text formats, such as plain text, rich text, and Multiple Internet Mail Extension (MIME) format.

In one embodiment, a method includes receiving a message in a native format, dynamically selecting a format for providing a response to the message, and providing the response in the dynamically-selected format. The response can be provided automatically, The independent format is independent of a character set or language, while the native format can be in a given character set or language. The method can further include including a pre-formulated answer in the response, wherein the pre-formulated answer is provided in the naive format as part of the response.

In another embodiment, a system includes receiving means for receiving a message in a native format, selecting means for dynamically selecting a format for providing a response to the message, and providing means for providing the response in the dynamically-selected format. The system can further include including means for including a pre-formulated answer in the response, wherein the pre-formulated answer is provided in the native format as part of the response.

In yet another embodiment, a system includes a receiving module to receive a message in a native format, a selecting module to dynamically select a format for providing a response to the message, and a providing module to provide the response in the dynamically-selected format. The system can further include an including module for including a pre-formulated answer in the response, wherein the pre-formulated answer is provided in the native format as part of the response.

In another embodiment, a computer system includes a processor and a memory configured to store instructions. The instructions include receiving instructions to receive a message in a native format, selecting instructions to dynamically select a format to provide a response to the message, and providing instructions to provide the response in the dynamically-selected format. The instructions can further comprise including instructions for including a pre-formulated answer in the response, wherein the pre-formulated answer is provided in the native format as part of the response.

In yet another embodiment, a computer program product includes a computer-readable medium to store instructions. The instructions include receiving instructions to receive a message in a native format, selecting instructions to dynamically select a format to provide a response to the message, and providing instructions to provide the response in the dynamically-selected format. The instructions can further comprise including instructions for including a pre-formulated answer in the response, wherein the pre-formulated answer is provided in the native format as part of the response.

BRIEF DESCRIPTION OF THE DRAWINGS

The present invention may be better understood, and its numerous objectives, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

The present invention provides a method, system, computer system, and computer program product to receive a message in a native format, dynamically select a format for providing a response to the message, and provide the response in the selected format. One of skill in the art will understand that messages can include e-mail, web chat messages, short messaging service messages, and other forms of text messaging. The native format of the message can be, for example, determined by the environment in which the message was prepared.

The present invention can provide a response in the native format of the original message or in another format, such as a format used to prepare the response. The format of the response in which the response is to be displayed can be dynamically selected when the response is to be presented.

The response can be generated automatically or prepared by a user. The response can include data in an independent format that can be interpreted and displayed by a single user interface. For example, the response can include a pie-formulated answer to a question posed in the original message, and the pre-formulated answer can be stored in a format independent of any character set or language. The independent format need not correspond to either the native format or the format used to prepare the response. The response is provided in the dynamically-selected format.

Figure 1:
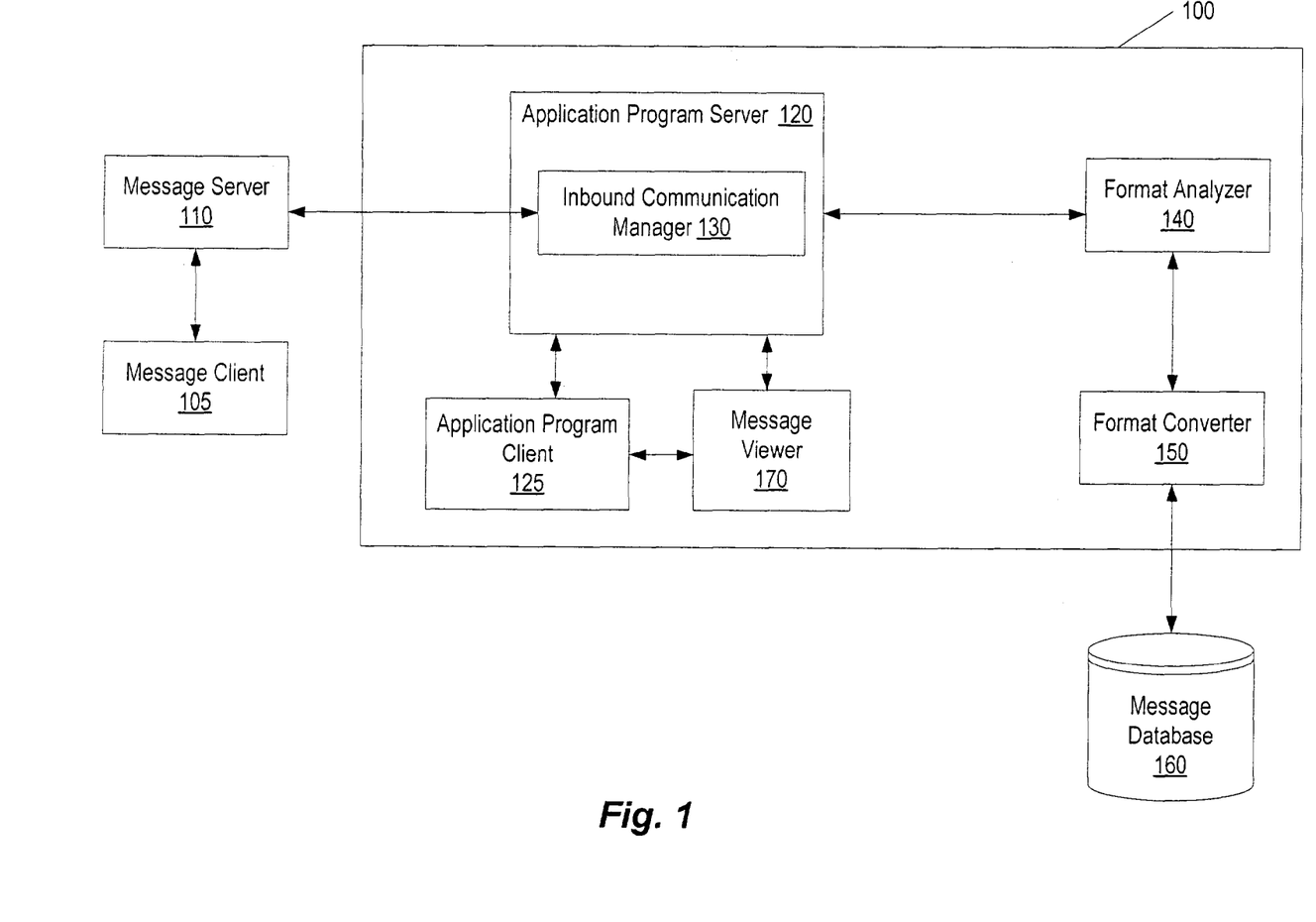
FIG. 1 shows an example embodiment of a system to provide a single interface to present messages in a variety of different formats.

FIG. 1 shows an example embodiment of a system 100 that provides a single interface to present messages in a variety of different formats. Shown as external to system 100 are a message client 105 used to prepare a message to be sent and a message server 110 to deliver the message to the recipient. In one embodiment, message client 105 is equivalent to an e-mail client, such as a Microsoft Outlook e-mail client, and message server 110 is equivalent to an e-mail server, such as Microsoft Outlook Exchange e-mail server. One of skill in the art will also understand that the functionality of message client 105 and message server 110 may be included within system 100, although this functionality is not a requirement for operation of the invention.

Shown within system 100 is application program server 120. Application program server 120 and application program client 125 may provide, for example, a customer service application to support service requests from customers. Application program server 120 is capable of obtaining messages from message server 110 and ensuring that the messages can be displayed in a variety of formats. In the embodiment shown in FIG. 1, application program server 120 includes inbound communication manager 130, which communicates directly with message server 110 to obtain the messages. In one embodiment, inbound communication manager 130 operates in conjunction with a channel driver (not shown) communicating via a communication application programming interface (API), also not shown. The channel driver listens to the message channel and detects messages arriving at a given message server. This channel driver provides information about incoming messages to inbound communication manager 130 and is described in further detail in application Ser. No. 09/823,769, filed on Mar. 31, 2001, entitled "Configurable Media-Independent Server," and naming Anil K. Annadata and Mingte Chen as inventors, the application being incorporated herein by reference in its entirety.

Messages are displayed to a user, such as a customer service agent, via application program client 125. In an alternative embodiment, the functionality of message client 105 can be provided within application program client 125.

System 100 also includes format analyzer 140, format converter 150, and message viewer 170. One of skill in the art will recognize that the functionality provided by each element shown can be provided by one or more elements arranged in a variety of architectures. For example, inbound communication manager 130 may be a module outside, but in communication with, application program server 120. Similarly, format analyzer 140, and/or format converter 150 may be modules within application program server 120. In the embodiment shown, application program client 125 can communicate with message viewer 170 to receive messages to display. Alternatively, messages between message viewer 170 and application program client 125 may be communicated through application program server 120, or message viewer 170 may be a module within application program client 125.

Format analyzer 140 analyzes a message received to determine the format of the message, and format converter 150 converts the message to an independent format to be stored in message database 160. In one embodiment, the independent format is Unicode Transformation Format (UTF) 16. Unicode is a 16-bit encoding for characters that provides a unique number for every character commonly used in text interchange throughout the world, independent of platform, program, and language. Unicode values include two bytes, rather than one, to represent each character.

A codepage is a list of selected character codes in a certain order. Codepages are usually defined to support specific languages or groups of languages that share common writing systems. The order of the character codes in a codepage allows the system to provide the appropriate character code to an application when a user presses a key on the keyboard. When a new codepage is loaded into the computer system memory, different character codes are provided to the application. For example, typically a different codepage is loaded when processing Japanese characters than the codepage loaded for English characters.

Figure 2:
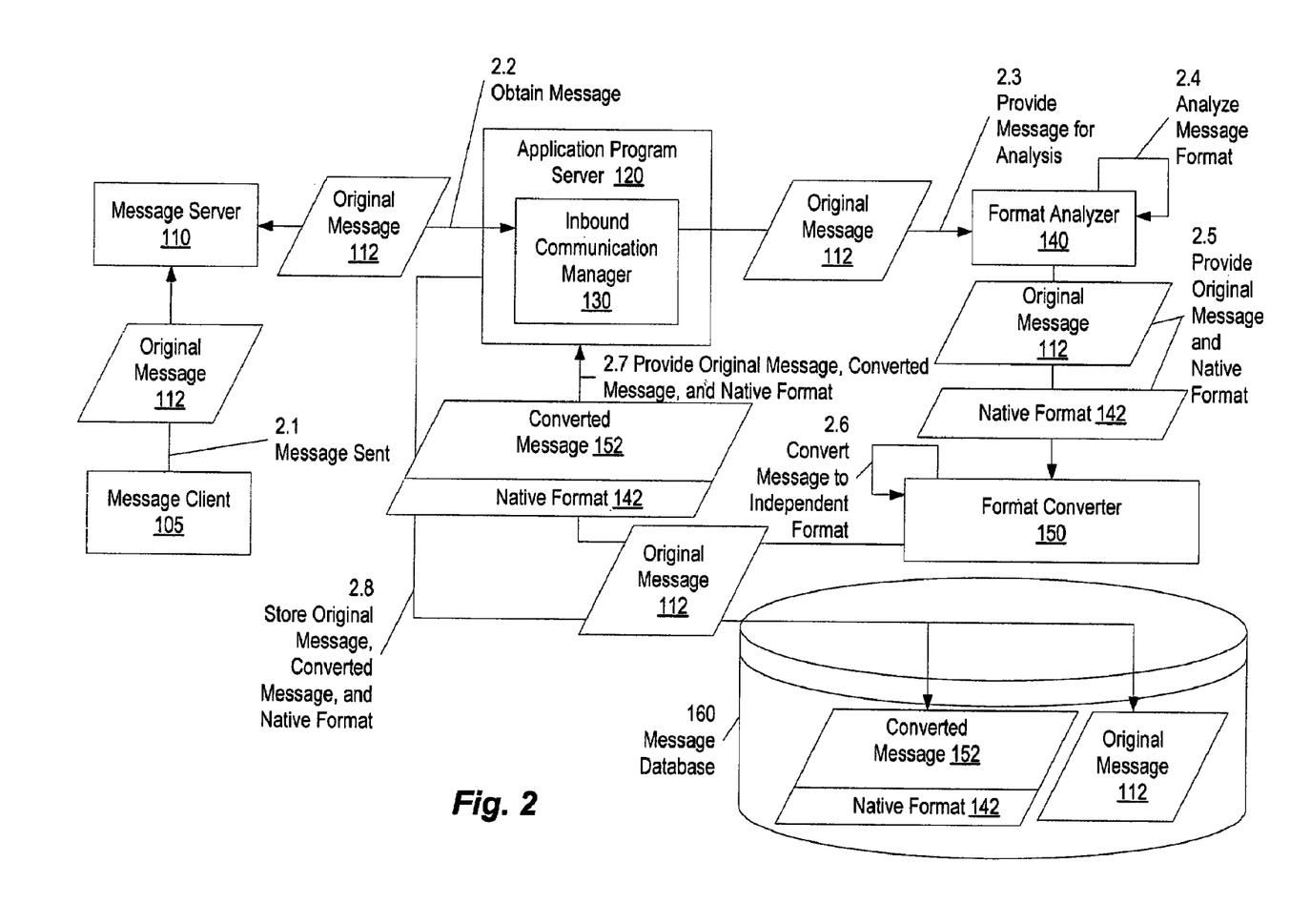
FIG. 2 shows an example data flow for receiving a message in the system of FIG. 1.

FIG. 2 shows an example data flow for receiving a message in the system of FIG. 1. In action 2.1, message client 105 is used to send an original message 112 to message server 110. In action 2.2, inbound communication manager 130 obtains original message 112 from message server 110. In action 2.3, application program server 120 obtains original message 112 from inbound communication manager 130 and provides original message 112 to format analyzer 140. In action 2.4, format analyzer 140 analyzes the message to determine the native format of the message. Native format 142 represents an indicator of the native format of the message; for example, native format 142 might indicate that the original message was written using a rich text format in a Japanese character set. In action 2.5, format analyzer 140 provides original message 112 and native format 142 to format converter 150.

In action 2.6, format converter 150 uses native format 142 to convert original message 112 to an independent format, with the independent format taking form as converted message 152.

In action 2.7, format converter provides original message 112 and converted message 152, along with the native format 142 of the original message 112, to application program server 120. In action 2.8, application program server 120 stores original message 112 and converted message 152, along with the native format 142 of the original message 112, in message database 160. An association is made between the original message and its native format as well as with the converted form of the message. One of skill in the art will understand that such an association can be made in various ways, such as by adding a record to a database relationship table for a relationship between associated data records.

Figure 3:
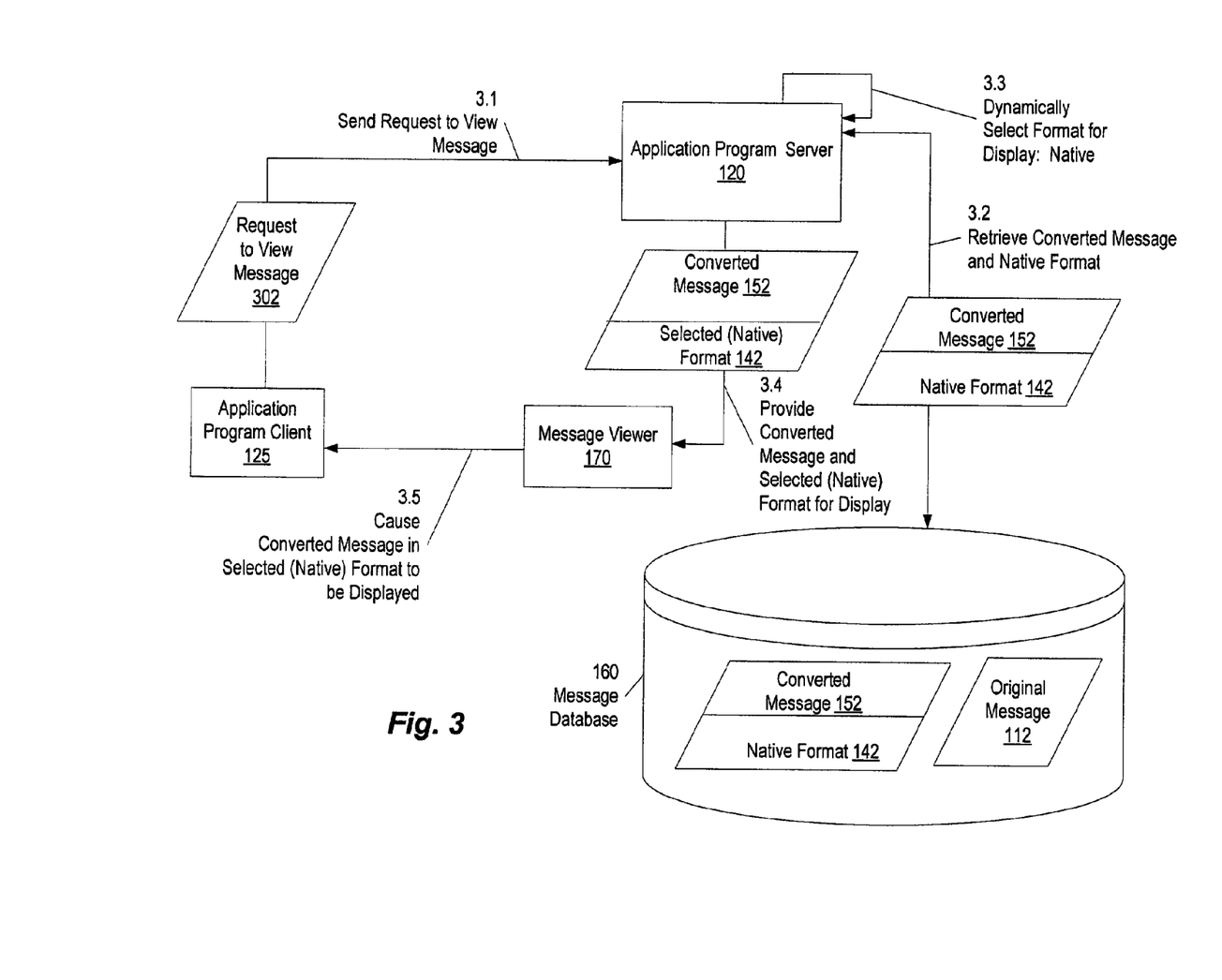
FIG. 3 shows an example data flow for responding for a request to view the message received in the data flow of FIG. 2.

FIG. 3 shows an example data flow for responding to a request to view the message received in the data flow of FIG. 2. In action 3.1, a user of application program client 125 sends a request to view message 302 to application program server 120. For example, a customer service agent may open the message, which describes a problem encountered by a user. In action 3.2, application program server 120 retrieves converted message 152 and native format 142 from message database 160.

In action 3.3, application program server 120 dynamically selects a format for displaying the message. In the example shown, application program server 120 dynamically selects to provide the message in native format 142. Alternatively, application program server 120 could select other formats, such as a default format for the customer service agent reading the message. In action 3.4, application program server 120 provides converted message 152 and the selected format, in this case native format 142, to message viewer 170 for display. In action 3.5, message viewer 170 causes converted message 152, stored in the independent format, to be displayed in native format 142 via application program client 125.

Figure 4A:
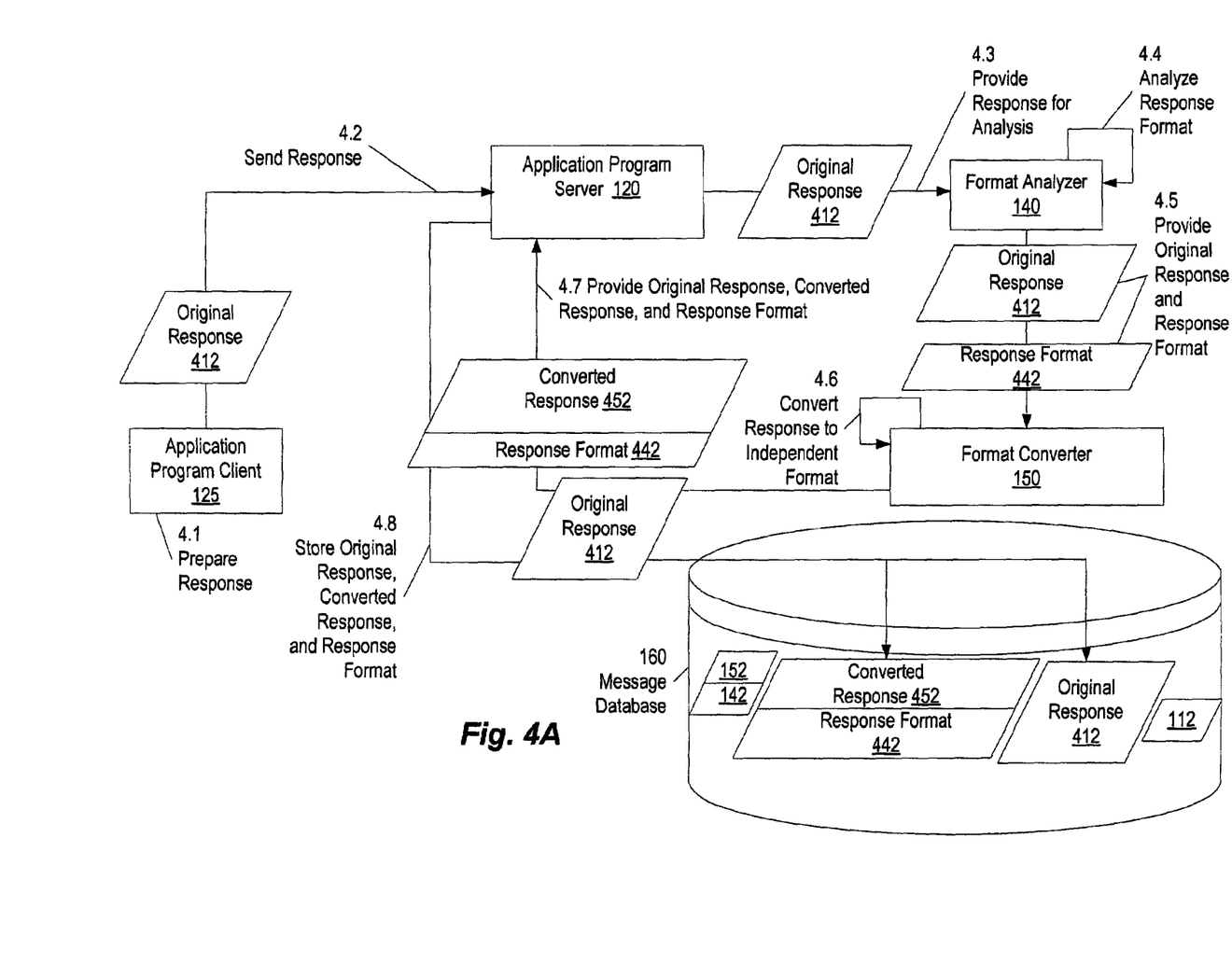
FIGS. 4A and 4B, collectively referred to as FIG. 4, show an example data flow for sending a response to the message received in the data flow of FIG. 2.
Figure 4B:
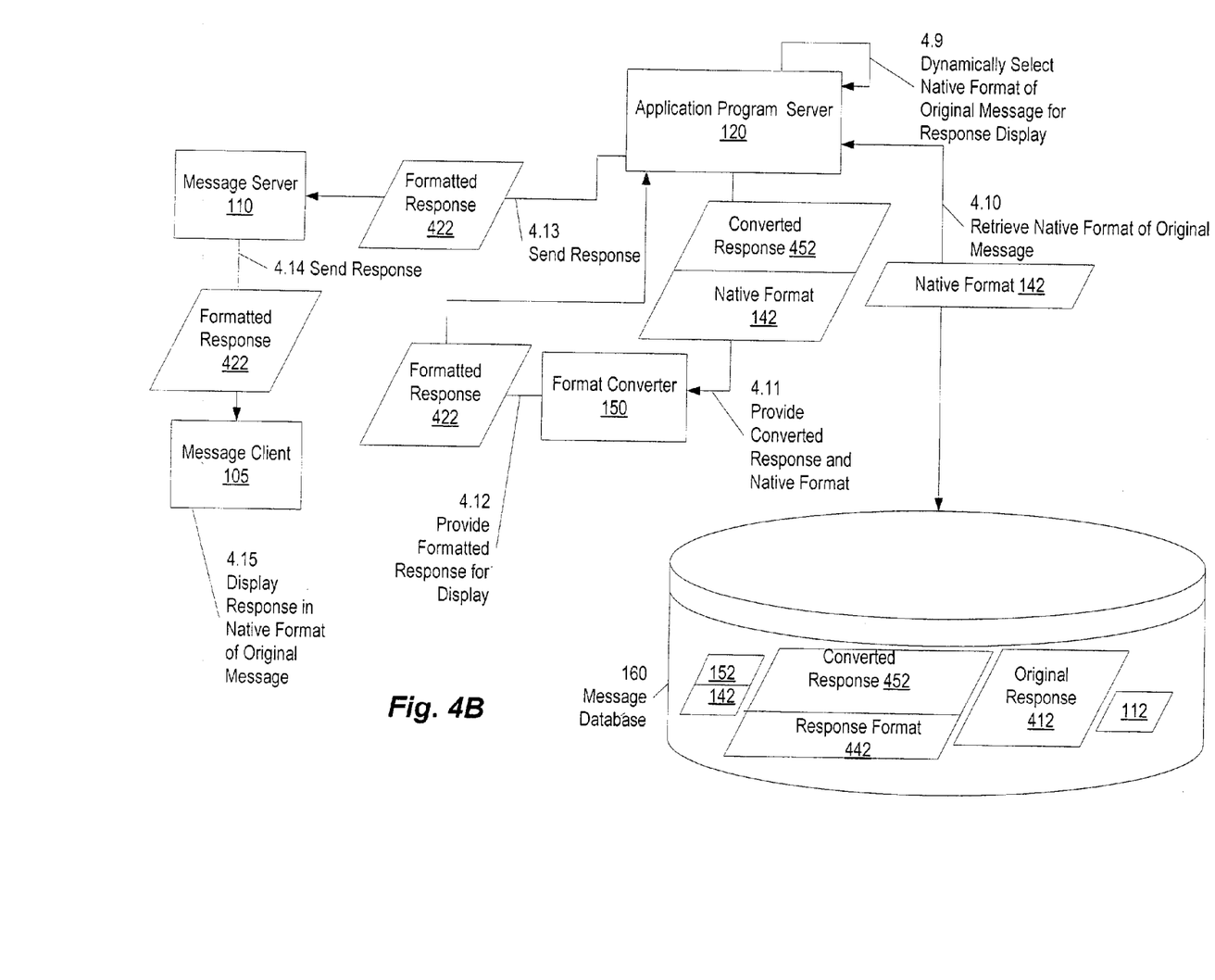

FIGS. 4A and 4B, collectively referred to as FIG. 4, show an example data flow for sending a response to the message received in the data flow of FIG. 2. In action 4.1, application program client 125 is used to prepare an original response 412, for example, as a response to an original message received from a customer. In action 4.2, the response is sent to application program server 120. As an alternative to actions 4.1 and 4.2, a response can be automatically generated by application program server 120. For example, messages having certain content, such as a frequently asked question, may have pre-formulated responses that can be automatically provided without the need to involve a customer service agent.

When the response is determined or prepared, in action 4.3, the response is provided to format analyzer 140, which analyzes the format of the response in action 4.4. In action 4.5, the original response 412 and response format 442 are provided to format converter 150. In action 4.6, the original response 412 is converted to an independent format, which takes form as converted response 452. In action 4.7, the original response 412, converted response 452, and response format 442 are provided by format converter 150 to application program server 120. In action 4.8, the original response 412, converted response 452, and response format 442 are stored by application program server 120 in message database 160. The response data are associated with the original message data such that data about the original message are available when processing the response. For example, an association can be made between original message 112 and original response 412.

FIG. 4B shows continuation of the activity for the response after the response is prepared and data about the response are stored. In action 4.9, after storing the response data in message database 160, application program server 120 dynamically selects a format in which to provide the response message to the sender of the original message. In this example, assume that the response is to be provided in a format matching that of the original message to which the response serves as a reply. In action 4.10, application program server 120 retrieves the native format 142 of the original message 112, as well as converted response 452. Retrieval of the data uses the association established with original message 112 when original response 412 data are stored.

In action 4.11, application program server 120 provides converted response 452 in native format 142 to format converter 150, which provides a formatted response 422 in action 4.12 to application program server 120. In action 4.13, application program server 120 then sends formatted response 422 to message server 110. When the user opens the e-mail response, message server 110 sends formatted response 422 in action 4.14 to message client 105. In action 4.15, message client 105 displays the response in the native format 142 of original message 112.

Figure 5:
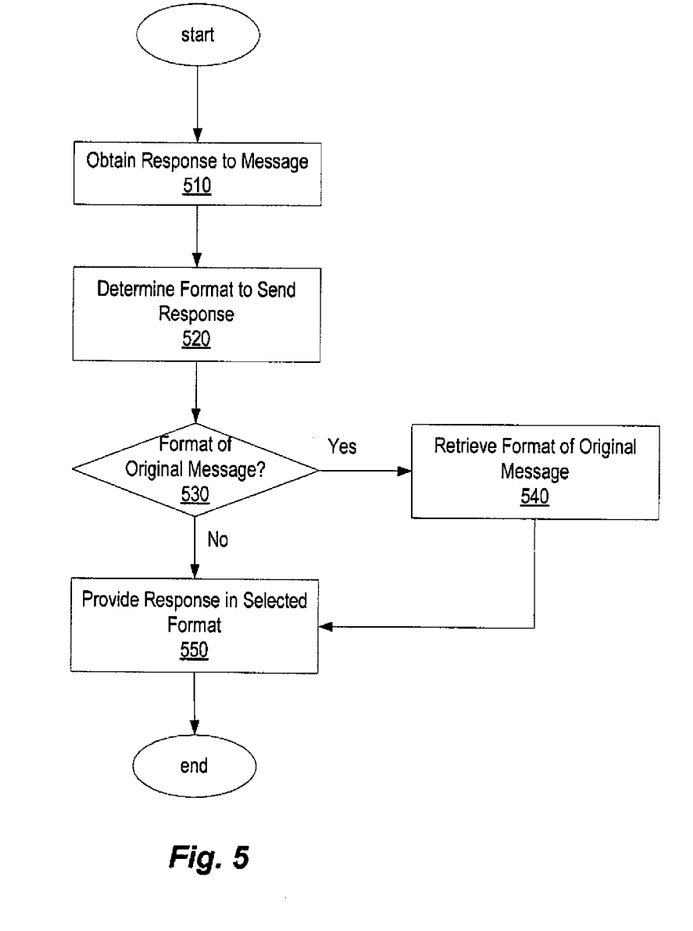
FIG. 5 shows a flowchart of the data flow for providing a response to a message.

FIG. 5 shows a flowchart of the data flow for providing a response to a message. In "Obtain Response to Message" step 510, a response to the message is obtained. As described above with reference to FIG. 4A actions 4.1 and 4.2, the response may be automatically generated or prepared by a customer service agent using application program client 125. In "Determine Format to Send Response" step 520, a format in which to provide the response is determined. In one embodiment, responses may be formatted in accordance with the format of the original message. Alternatively, responses may be formatted as originally prepared by the agent, in a configurable default format, or in a different format altogether selected by a user or by logic within application program server 120.

At "Format of Original Message" decision point 530, if the selected format is to match the format of the original message, the format of the original message is retrieved in "Retrieve Format of Original Message" step 540. If another format is selected, control proceeds directly to "Provide Response in Selected Format" step 550. In "Provide Response in Selected Format" step 550, the response is provided in the selected format.

The above-described embodiments can be implemented using a variety of computer systems and architectures. The following section describes an example computing and network environment in which the present invention can be practiced.

An Example Computing and Network Environment

Figure 6:
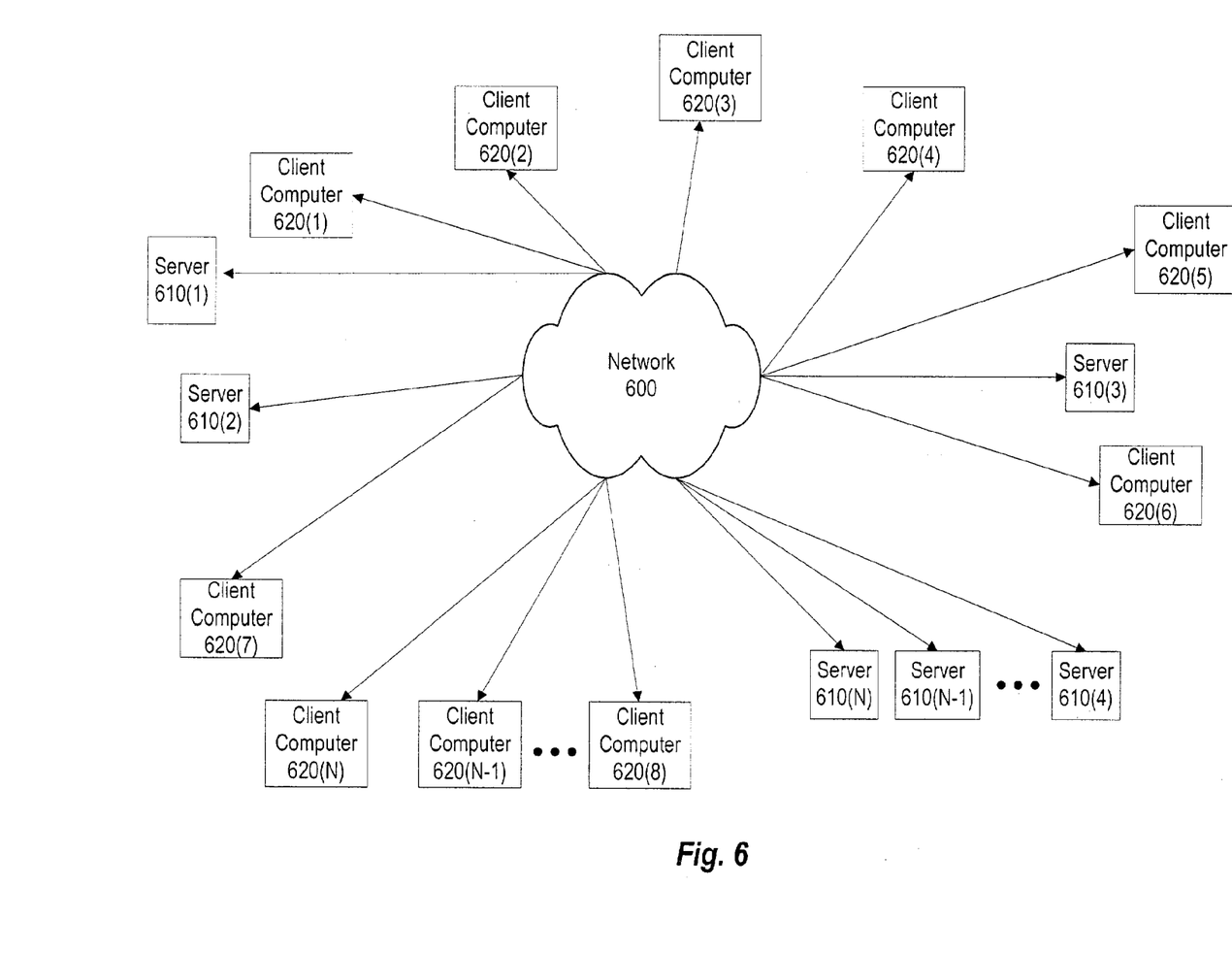
FIG. 6 shows an example of a networking environment in which the present invention can operate.

FIG. 6 is a block diagram illustrating a network environment in which a system according to the present invention may be practiced. As is illustrated in FIG. 6, network 600, such as a private wide area network (WAN) or the Internet, includes a number of networked servers 610(1)-(N) that are accessible by client computers 620(1)-(N). Communication between client computers 620(1)-(N) and servers 610(1)-(N)

typically occurs over a publicly accessible network, such as a public switched telephone network (PSTN), a DSL connection, a cable modem connection or large bandwidth trunks (e.g., communications channels providing T1 or OC3 service) or wireless link. Client computers 620(1)-(N) access servers 610(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 620(1)-(N).

One or more of client computers 620(1)-(N) and/or one or more of servers 610(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 620(1)-(N), is shown in detail in FIG. 6.

Figure 7:
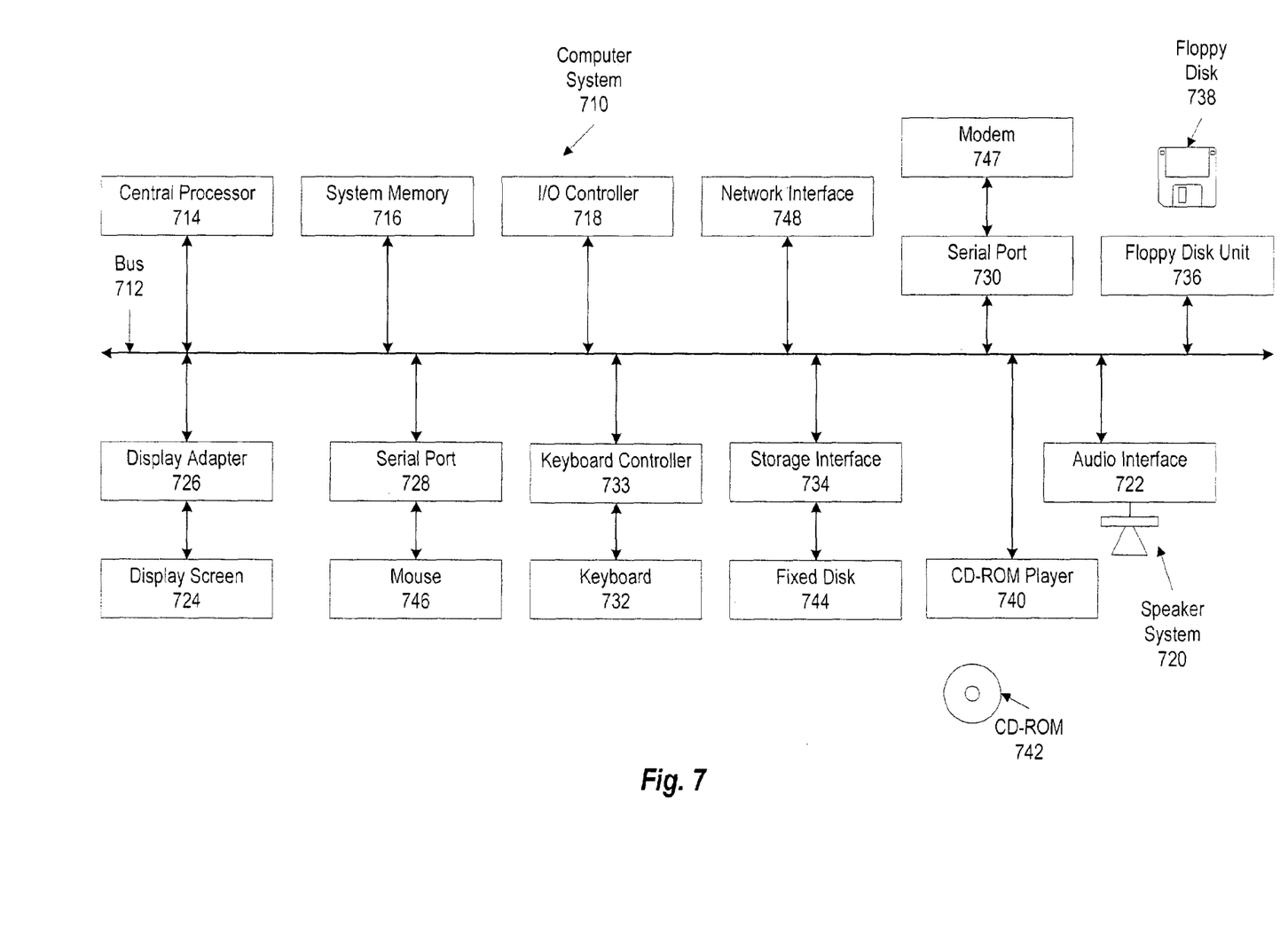
FIG. 7 shows an example of a computer system that can be used to operate the present invention.

FIG. 7 depicts a block diagram of a computer system 710 suitable for implementing the present invention, and example of one or more of client computers 620(1)-(N). Computer system 710 includes a bus 712 which interconnects major subsystems of computer system 710 such as a central processor 714, a system memory 716 (typically RAM, but which may also include ROM, flash RAM, or the like), an input/output controller 718, an external audio device such as a speaker system 720 via an audio output interface 722, an external device such as a display screen 724 via display adapter 726, serial ports 728 and 730, a keyboard 732 (interfaced with a keyboard controller 733), a storage interface 734, a floppy disk drive 736 operative to receive a floppy disk 738, and a CD-ROM drive 740 operative to receive a CD-ROM 742. Also included are a mouse 746 (or other point-and-click device, coupled to bus 712 via serial port 728), a modem 747 (coupled to bus 712 via serial port 730) and a network interface 748 (coupled directly to bus 712).

Bus 712 allows data communication between central processor 714 and system memory 716, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., CD-ROM drive 740), floppy disk unit 736 or other storage medium. Additionally, applications may be in the form of electronic signals modulated in accordance with the application and data communication technology when accessed via network modem 747 or interface 748.

Storage interface 734, as with the other storage interfaces of computer system 710, may connect to a standard computer readable medium for storage and/or retrieval of information, such as a fixed disk drive 744. Fixed disk drive 744 may be a part of computer system 710 or may be separate and accessed through other interface systems. Many other devices can be connected such as a mouse 746 connected to bus 712 via serial port 728, a modem 747 connected to bus 712 via serial port 730 and a network interface 748 connected directly to bus 712. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, general packet radio service (GPRS) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 716, fixed disk 744, CD-ROM 742, or floppy disk 738. Additionally, computer system 710 may be any kind of computing device, and so includes personal data assistants (PDAs), network appliance, X-window terminal or other such computing device. Computer system 710 also supports a number of Internet access tools, including, for example, an HTTP-compliant web browser having a JavaScript interpreter.

Advantages of the present invention are many. The invention allows companies to communicate with customers using a variety of electronic messaging systems, languages, and formats using a single user interface for agents. Messages can be communicated in one language, such as Japanese, requiring a different character set for display than the default configuration for the recipient, who may, for example, use English as a default language. The original format of a message is preserved and can be used in formulating a response to the message. The format of a response can be dynamically selected in accordance with needs of the business organization. Pre-formulated answers to requests can be automatically provided in the native format used by a user in sending the original message, in a specified default format, or in another format determined to be suitable for a particular situation.

Other Embodiments

The foregoing describes an embodiment wherein some components are contained within other components (e.g., inbound communication manager 130 within application server program 120 in FIG. 1). It is to be understood that such depicted architectures are merely examples; in fact, many other architectures can be implemented that achieve the same functionality. Any arrangement of components to achieve the same functionality is effectively "associated" such that the desired functionality is achieved.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving a first message from a first sender and a second message from a second sender,
   wherein
      the first message is in a first character set and a first native format,
      the second message is in a second character set and second native format,
      the first native format and the second native format are each formats for formatting electronic messages, and
      the first native format differs from the second native format;
   converting the first message from the first native format to an independent format, wherein
      said converting the first message from the first native format is performed by a first processor in a messaging system;
   converting the second message from the second native format to the independent format;
   storing the first message and the second message in the independent format;
   selecting a first display format for the first message and a second display format for the second message, wherein
      the first display format differs from the first native format, and
      the second display format differs from the second native format;
   converting the first message from the independent format to the first display format and the second message from the independent format to the second display format;
   displaying the first message in the first display format, wherein
      said displaying the first message comprises displaying the first message to a user via an application program client;
   displaying the second message in the second display format, wherein
      said displaying the second message comprises displaying the second message to the user via the application program client;
   receiving, via the application program client, a first response to the first message and a second response to the second message, wherein
      the first response is in a first response character set and a first response format,
      the second response is in a second response character set and a second response format,
      the first response format and the second response format each specify a format for formatting electronic messages,
      the first response format differs from the first native format, and
      the second response format differs from the second native format;
   converting the first response from the first response format to the independent format and converting the second response from the second response format to the independent format;
   dynamically selecting a first final response format for the first response and dynamically selecting a second final response format for the second response, wherein
      said dynamically selecting the first final response format comprises retrieving an indicator of the first native format, if the first final response format is to be the same as the first native format,
      said dynamically selecting the second final response format comprises retrieving an indicator of the second native format, if the second final response format is to be the same as the second native format, and
      the first final response format and the second final response format each specify a format for formatting electronic messages;
   converting the first response from the independent format to the first final response format and converting the second response from the independent format to the second final response format;
   including a pre-formulated content in the first response, wherein
      the pre-formulated content is responsive to a portion of the first message, and
      the pre-formulated content is provided in the first native format as part of the first response; and
   providing the first response in the first final response format to the first sender and providing the second response in the second final response format to the second sender.

2. The method of claim 1, wherein the first response is automatically generated.

3. The method of claim 1, wherein the first native format and the first final response format are not the same.

4. The method of claim 1, further comprising:
displaying the first message on a user interface in the first response format.

5. The method of claim 1, further comprising:
storing the first response in the first response format; and
using a message viewer to display the first response in the first native format.

6. The method of claim 1, wherein said dynamically selecting the first final response format comprises:
in response to retrieving the indicator of the first native format, setting the first final response format to be the first native format.

7. The method of claim 1, wherein the first response is generated at least in part by
sending a request to view the first message;
retrieving the first message stored in the independent format;
retrieving the indicator of the first native format; and
viewing the first message to generate a response thereto.

8. The method of claim 1, wherein
the independent format is Unicode Transformation Format.

9. The method of claim 1, wherein
the first native format and the first final response format are the same, and
the first display format, the second display format, the first response format, and the second response format are the same.

10. The method of claim 1, wherein the pre-formulated content is stored in the independent format and is responsive to a query in the first message.

11. The method of claim 1, further comprising:
retrieving, in response to the first message, the pre-formulated content from a storage device, wherein
the pre-formulated content is stored in the independent format in the storage device, and
the pre-formulated content is responsive to a query in the first message;
including the pre-formulated content in the first response; and
converting the pre-formulated content from the independent format to the first native format.

12. The method of claim 1, further comprising:
retrieving, in response to the first message, the pre-formulated content from a storage device, wherein
the pre-formulated content is stored in the independent format in the storage device, and
the pre-formulated content is responsive to a query in the first message;
including the pre-formulated content in the first response; and
converting the pre-formulated content from the independent format to the first final response format, wherein
the first native format and the first final response format are not the same.

13. A system comprising:
a first receiving module configured to receive a first message from a first sender and a second message from a second sender, wherein
the first message is in a first character set and a first native format,
the second message is in a second character set and a second native format,
the first native format and the second native format are each formats for formatting electronic messages, and
the first native format differs from the second native format;
a first converting module, wherein the first converting module comprises a processor configured to convert the first message from the first native format to an independent format and to convert the second message from the second native format to the independent format;
a first storing module configured to store the first message and the second message in the independent format;
a first selecting module configured to select a first display format for the first message and a second display format for the second message, wherein
the first display format differs from the first native format, and
the second display format differs from the second native format;
a second converting module configured to convert the first message from the independent format to the first display format and to convert the second message from the independent format to the second display format;
a first displaying module configured to display the first message in the first display format, wherein
said displaying the first message comprises displaying the first message to a user via an application program client;
a second displaying module configured to display the second message in the second display format, wherein
said displaying the second message comprises displaying the second message to the user via the application program client;
a second receiving module configured to receive, via the application program client, a first response to the first message and to receive a second response to the second message, wherein
the first response is in a first response character set and a first response format,
the second response is in a second response character set and a second response format,
the first response format and the second response format each specify a format for formatting electronic messages,
the first response format differs from the first native format, and
the second response format differs from the second native format;
a third converting module configured to convert the first response from the first response format to the independent format and to convert the second response from the second response format to the independent format;
a second selecting module configured to dynamically select a first final response format for the first response and to dynamically select a second final response format for the second response, wherein
said dynamically selecting the first final response format comprises retrieving an indicator of the first native format, if the first final response format is to be the same as the first native format,
said dynamically selecting the second final response format comprises retrieving an indicator of the second native format, if the second final response format is to be the same as the second native format, and
the first final response format and the second final response format each specify a format for formatting electronic messages;

a fourth converting module configured to convert the first response from the independent format to the first final response format and to convert the second response from the independent format to the second final response format;

an including module configured to include a pre-formulated content in the first response, wherein
the pre-formulated content is responsive to a portion of the first message, and
the pre-formulated content is provided in the first native format as part of the first response; and
a providing module configured to provide the first response in the first final response format to the first sender and to provide the second response in the second final response format to the second sender.

14. The system of claim 13, further comprising:
a generating module configured to automatically generate the first response.

15. The system of claim 13, wherein
the independent format is Unicode Transformation Format.

16. A computer system comprising:
a processor to execute instructions;
a memory comprising the instructions, wherein the instructions comprise:
a first set of receiving instructions configured to receive
a first message from a first sender and a second message from a second sender, wherein
the first message is in a first character set and a first native format,
the second message is in a second character set and a second native format,
the first native format and the second native format are each formats for formatting electronic messages, and
the first native format differs from the second native format;
a first set of converting instructions configured to convert the first message from
the first native format to an independent format and to convert the second message from the second native format to the independent format;
a first set of storing instructions configured to store the first message and the second message in the independent format;
a first set of selecting instructions configured to select a first display format for the first message and a second display format for the second message, wherein
the first display format differs from the first native format, and
the second display format differs from the second native format;
a second set of converting instructions configured to convert the first message from the independent format to the first display format and to convert the second message from the independent format to the second display format;
a first set of displaying instructions configured to display the first message in the first display format, wherein
said displaying the first message comprises displaying the first message to a user via an application program client;
a second set of displaying instructions configured to display the second message in the second display format, wherein said displaying the second message comprises displaying the second message to the user via the application program client;
a second set of receiving instructions configured to receive, via the application program client, a first response to the first message and to receive a second response to the second message, wherein
the first response is in a first response character set and a first response format,
the second response is in a second response character set and a second response format,
the first response format and the second response format each specify a format for formatting electronic messages,
the first response format differs from the first native format, and
the second response format differs from the second native format;
a third set of converting instructions configured to convert the first response from the first response format to the independent format and to convert the second response from the second response format to the independent format;
a second set of selecting instructions configured to dynamically select a first final response format for the first response and to dynamically select a second final response format for the second response, wherein
said dynamically selecting the first final response format comprises retrieving an indicator of the first native format, if the first final response format is to be the same as the first native format,
said dynamically selecting the second final response format comprises retrieving an indicator of the second native format, if the second final response format is to be the same as the second native format, and
the first final response format and the second final response format each specify a format for formatting electronic messages;
a fourth set of converting instructions configured to convert the first response from the independent format to the first final response format and to convert the second response from the independent format to the second final response format;
including instructions configured to include a pre-formulated content in the first response, wherein
the pre-formulated content is responsive to a portion of the first message, and
the pre-formulated content is provided in the first native format as part of the first response; and
providing instructions configured to provide the first response in the first final response format to the first sender and to provide the second response in the second final response format to the second sender.

17. The computer system of claim 16, wherein the instructions further comprise:
generating instructions configured to automatically generate the first response.

18. A computer program product comprising:
a non-transitory computer-readable medium having instructions encoded thereon, wherein the instructions comprise:
a first set of receiving instructions configured to receive a first message from a first sender and a second message from a second sender, wherein the first message is in a first character set and a first native format, the second message is in a second character set and a second native format, the first native format and the second native format are each formats for formatting electronic messages, and the first native format differs from the second native format;

a first set of converting instructions configured to convert the first message from the first native format to an independent format and to convert the second message from the second native format to the independent format;

a first set of storing instructions configured to store the first message and the second message in the independent format;

a first set of selecting instructions configured to select a first display format for the first message and a second display format for the second message, wherein the first display format differs from the first native format, and the second display format differs from the second native format;

a second set of converting instructions configured to convert the first message from the independent format to the first display format and to convert the second message from the independent format to the second display format;

a first set of displaying instructions configured to display the first message in the first display format, wherein said displaying the first message comprises displaying the first message to the user via an application program client;

a second set of displaying instructions configured to display the second message in the second display format, wherein said displaying the second message comprises displaying the second message to the user via the application program client;

a second set of receiving instructions configured to receive, via the application program client, a first response to the first message and to receive a second response to the second message, wherein the first response is in a first response character set and a first response format, the second response is in a second response character set and a second response format, the first response format and the second response format each specify a format for formatting electronic messages, the first response format differs from the first native format, and the second response format differs from the second native format;

a third set of converting instructions configured to convert the first response from the first response format to the independent format and to convert the second response from the second response format to the independent format;

a second set of selecting instructions configured to dynamically select a first final response format for the first response and to dynamically select a second final response format for the second response, wherein said dynamically selecting the first final response format comprises retrieving an indicator of the first native format, if the first final response format is to be the same as the first native format, said dynamically selecting the second final response format comprises retrieving an indicator of the second native format, if the second final response format is to be the same as the second native format, and the first final response format and the second final response format each specify a format for formatting electronic messages;

a fourth set of converting instructions configured to convert the first response from the independent format to the first final response format and to convert the second response from the independent format to the second final response format;

including instructions configured to include a pre-formulated content in the first response, wherein the pre-formulated content is responsive to a portion of the first message, and the pre-formulated content is provided in the first native format as part of the first response; and providing instructions configured to provide the first response in the first final response format to the first sender and to provide the second response in the second final response format to the second sender.

19. The computer program product of claim 18, wherein the instructions further comprise:

generating instructions to automatically generate the first response.

20. The computer program product of claim 18, wherein the independent format is Unicode Transformation Format.

\* \* \* \* \*

UNITED STATES PATENT AND TRADEMARK OFFICE
CERTIFICATE OF CORRECTION

| | | |
|---|---|---|
| PATENT NO. | : 8,230,112 B2 | |
| APPLICATION NO. | : 10/400895 | |
| DATED | : July 24, 2012 | |
| INVENTOR(S) | : Pak et al. | |

It is certified that error appears in the above-identified patent and that said Letters Patent is hereby corrected as shown below:

In column 2, line 5, delete "automatically," and insert -- automatically. --, therefor.

In column 2, line 10, delete "naive" and insert -- native --, therefor.

In column 3, line 45-46, delete "pie-formulated" and insert -- pre-formulated --, therefor.

In column 7, line 13, delete "620(l)-(N)" and insert -- 620(1)-(N) --, therefor.

Signed and Sealed this
Thirtieth Day of October, 2012

David J. Kappos
*Director of the United States Patent and Trademark Office*